April 15, 1958 G. J. SYKOKIS 2,830,712
COMBINED CONVEYORS OF CONTINUOUS MOTION
Filed Sept. 27, 1948 4 Sheets-Sheet 1
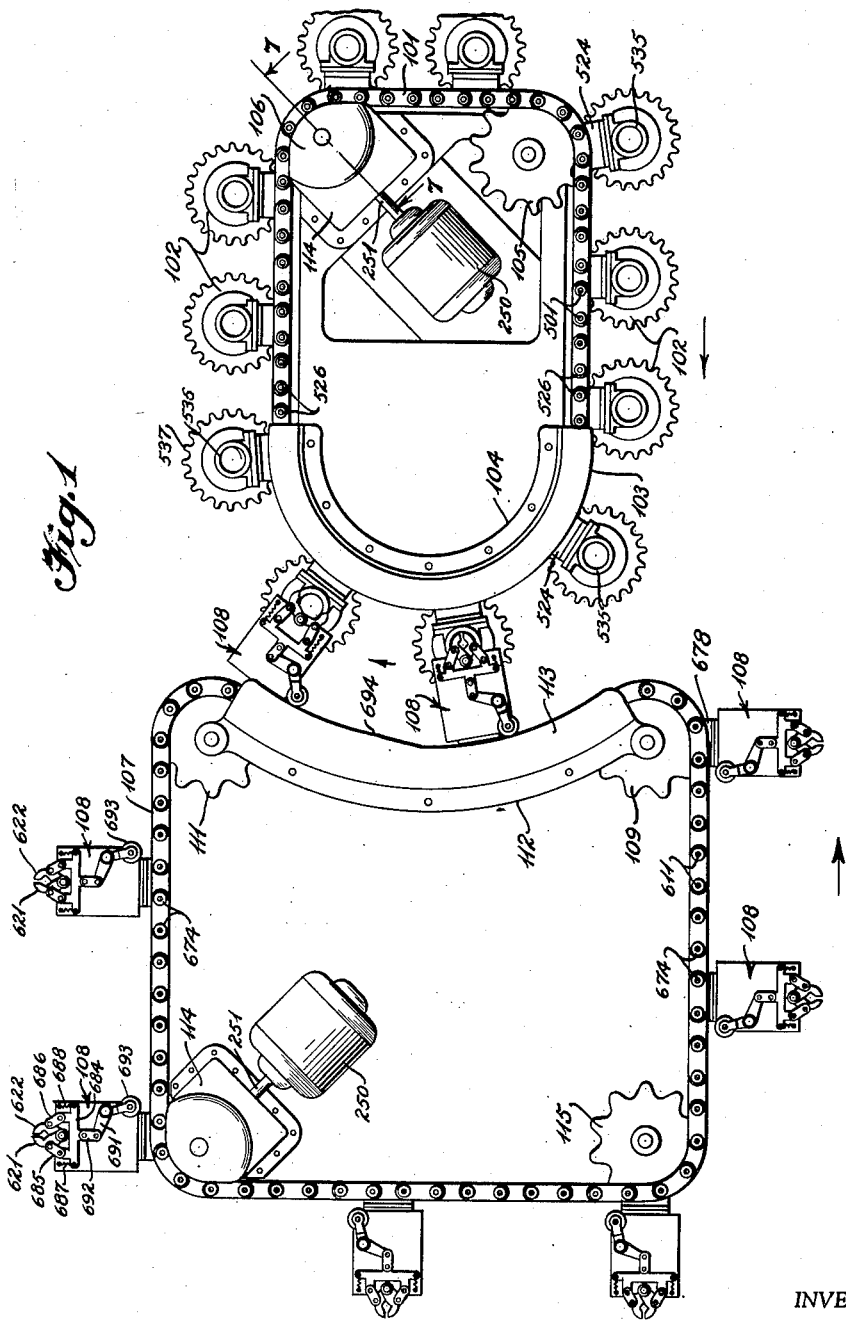
INVENTOR
George J. Sykokis
BY
ATTORNEYS

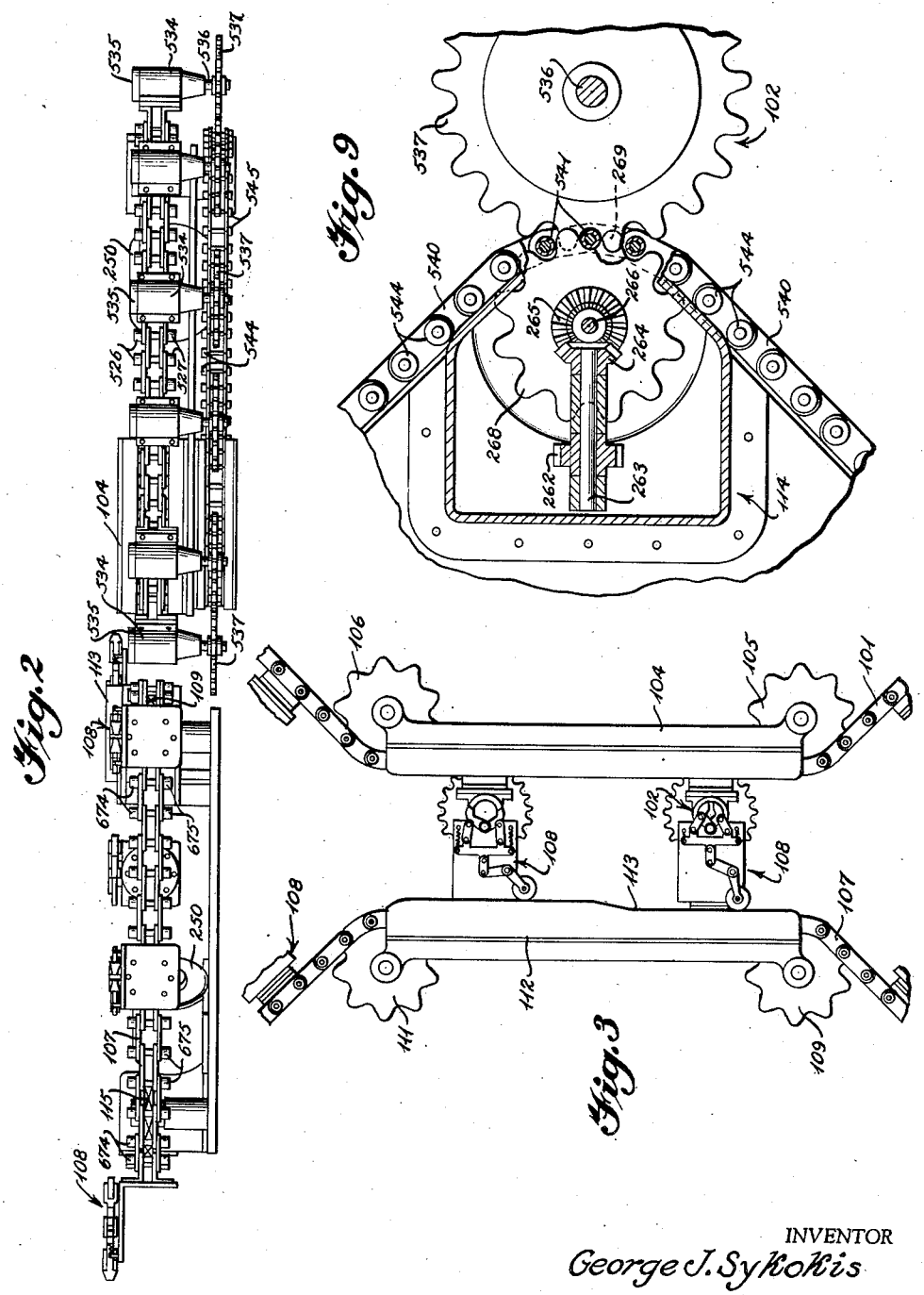

April 15, 1958      G. J. SYKOKIS      2,830,712
COMBINED CONVEYORS OF CONTINUOUS MOTION
Filed Sept. 27, 1948      4 Sheets-Sheet 3
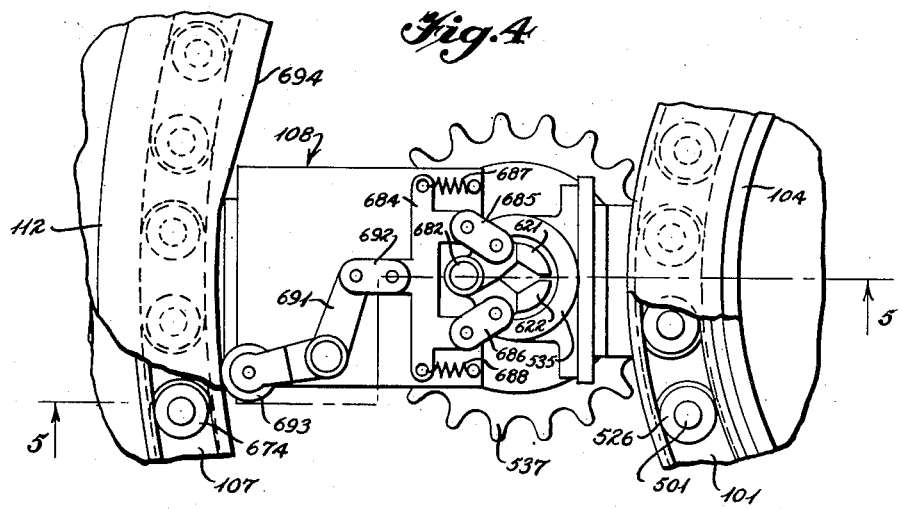
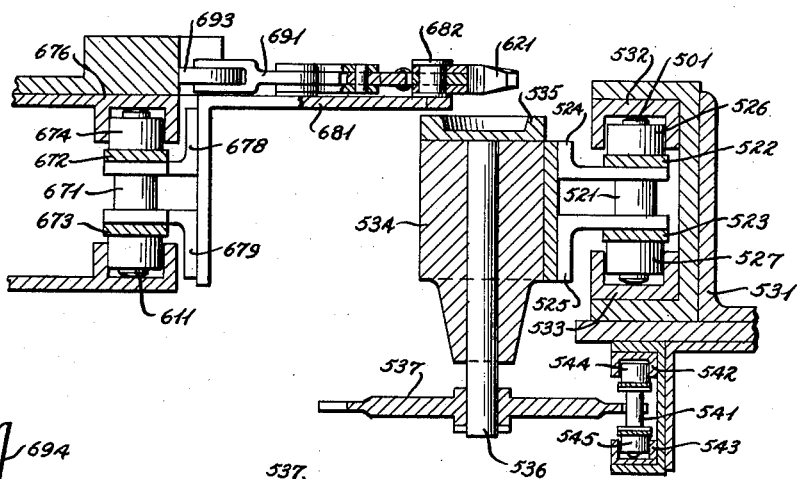
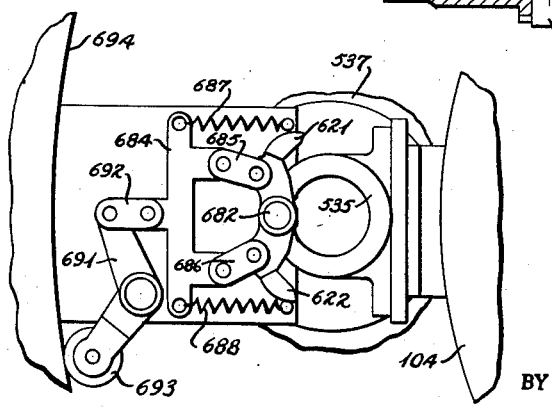
INVENTOR
George J. Sykokis
BY Beall and Jones
ATTORNEYS April 15, 1958  G. J. SYKOKIS  2,830,712
COMBINED CONVEYORS OF CONTINUOUS MOTION
Filed Sept. 27, 1948  4 Sheets-Sheet 4

INVENTOR
George J. Sykokis

BY  Beale and Jones

ATTORNEYS

United States Patent Office 2,830,712
Patented Apr. 15, 1958

2,830,712

COMBINED CONVEYORS OF CONTINUOUS MOTION

George J. Sykokis, Athens, Greece

Application September 27, 1948, Serial No. 51,438

3 Claims. (Cl. 214—1)

This invention relates to machines for performing operations upon continuously moving articles. More particularly, the present invention concerns an endless conveyor system in which article supports and operating devices are borne respectively by independent but co-operating conveyors.

In installations known heretofore, where articles are carried by conveyors and operated upon by one or more machines, in the processing, shaping finishing, filling, or transferring of articles, the operating machines have customarily been arranged on stationary bases. The conveyor motion was therefore necessarily intermittent, with the rest periods being governed by the time required to complete the operation. Further time losses were entailed in the period required for starting and stopping the conveyor.

A major object of the present invention is to provide a machinery system in which the operations of processing, shaping, finishing, filling, or transferring of articles, and/or other similar and related operations, may be performed during continuous movement of the conveyor system or systems and of the articles. More particularly, such a system would provide continuous conveyors both for the articles and for the operating devices for processing, shaping, finishing, filling, or transferring the articles.

Another important object of the invention is to provide for automatic operation of the operating devices as they are conveyed through the area in which the operation should take place. A collateral object of the invention is to provide an area through which there is continuous movement of articles and operating devices, but in which there is no relative movement between them other than that necessary for completing the operation.

Still another object of the invention is to provide means through which the articles may be rotated on their supports while traversing the operating area.

These and other objects of the invention may be achieved by the provision of a pair of continuous endless conveyors, each respectively carrying article supports and operating devices. Each conveyor may be provided with guides which determine co-adjacent, uniformly-spaced paths along which the conveyors move during at least a portion of their travel, these paths being so arranged that there is no relative linear or curvilinear movement between the operating devices and the article supports for an interval of time sufficiently long to permit performance of the desired operation. The particular arrangement of the co-adjacent, uniformly-spaced paths may be parallel, arcuate, or concentric. In most instances, the two endless conveyors may be arranged externally of each other so that their orbits of travel are entirely independent and are not contained one within the other. The orbits of travel may be in the same or in different planes, but in any case, the limited paths of movement, for a portion of their travel, are co-extensive, co-adjacent, and substantially uniformly spaced.

Each conveyor may be provided with cam and cam follower devices, for the purpose of causing operation of the operating devices during their movement along that portion of the predetermined path in which they are to operate upon the articles carried by the article supports. Also, if desired, the article supports may be pivotally mounted on the endless conveyors so that they are automatically turned about their pivots during the movement of the conveyor along the predetermined path portion of its travel. This may be accomplished by a chain and sprocket arrangement independent of the conveyor chain itself.

Other objects, advantages, and features of the invention will become apparent from the following detailed description of the invention, considered in conjunction with the accompanying drawings, wherein:

Fig. 1 is a top plan view of a conveyor system illustrating the movement of two independent conveyors along a co-adjacent, uniformly-spaced predetermined path;

Fig. 2 is a side elevational view of the system shown in Fig. 1;

Fig. 3 is a fragmentary top plan view of a modified form of the invention;

Fig. 4 is a fragmentary, enlarged, top plan detailed view of a part of the conveyor system shown in Fig. 1;

Fig. 5 is a sectional view taken on line 5—5 of Fig. 4;

Fig. 6 is a fragmentary, enlarged detailed view, showing the same structure as illustrated in Fig. 4, but with the jaws of the operating device in an open position;

Fig. 9 is a sectional view taken on line 9—9 of Fig. 7.

Figure 7:
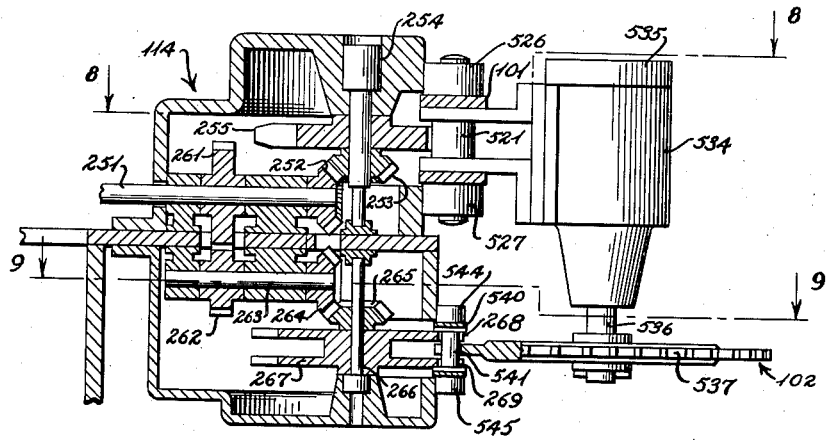
Fig. 7 is a sectional view taken on line 7—7 of Fig. 1.

In the preferred form of the invention, a pair of continuous flexible chain conveyors are arranged so that they have independent orbits of travel arranged externally of one another. Guides or tracks are provided for the conveyor chains, at least along a part of their orbits of travel, to determine co-adjacent uniformly-spaced paths for at least parts of the orbits of travel of the conveyors. One of the conveyors carries a plurality of spaced article supports, and the other conveyor carries a plurality of operating devices. As the article supports and the operating devices are moved along their uniformly-spaced co-adjacent paths, there is no relative movement between the supports and the devices, in order that the devices may perform such operations as may be desired upon the articles carried by the article supports. During the concomitant movement of the article supports and the operating devices by their respective chain conveyors along the co-adjacent, uniformly-spaced paths, the operating devices may be actuated, for example, by the operation of a cam follower moving along a cam track, following generally the path of the conveyor, and causing operation of the device during movement along its predetermined path. Similarly, the article supports may be pivotally mounted on the conveyor with means such as a sprocket arranged to engage a chain or other device, to cause the support to turn and thereby turn the article as it moves along this predetermined path concomitantly with the operating device.

Referring now to the illustrations of the invention as they appear in the accompanying drawings, there is shown in Fig. 1 a system having two mutually-independent endless conveyors, 101 and 107, respectively. A plurality of uniformly-spaced article supports 102 are carried by the first conveyor 101. The path of the first conveyor 101 is determined by means of a pair of guides 103 and 104 together with a pair of sprockets 105 and 106. It will be understood that the structure illustrated has been depicted in a simple form for ease of understanding and clarity of illustration. In the particular form illustrated, the path of the article-carrying conveyor 101, in that portion of its travel determined by the guides 103 and 104, is a curvilinear path.

The second endless conveyor 107 bears a plurality of operating devices 108. It will be obvious that the particular type of operating device is not important, since it may be one for performing any of the operations previously mentioned, such as, for example, processing, shaping, drilling, finishing, grinding, polishing, filling, or transferring the articles. The operating devices 108 are, of course, uniformly spaced along their conveyor 107. The conveyor 107 also has its own orbit of travel, depicted as being external of the orbit of travel of the first conveyor 101. It will be understood, however, that other arrangements are possible, including those in which the orbits are not external one to the other, but that the arrangement illustrated in Fig. 1 has been selected for ease of understanding and clarity of illustration. During that part of its travel between the two idler sprockets 109 and 111, which are located one at each end of the arcuate operating area, the second conveyor 107 is caused to move along a predetermined path by means of a pair of guides 112 and 113 which engage the conveyor. The operating devices 108 are thus carried through this predetermined path.

The conveyor 107 which carries the operating devices 108 is powered by a drive sprocket 114, driven by a motor 250 through a connecting driveshaft 251. In the relatively simple arrangement illustrated in Fig. 1, the complete path of the conveyor 107 is determined by the power-driven sprocket 114 together with three idler sprockets 111, 109, and 115, with the guides 112 and 113 determining a portion of the path between the idler sprockets 109 and 111 which are adjacent the arcuate operating area.

The guides 103 and 104, and 112 and 113, for the two conveyors respectively, are so arranged that the paths of movement of the operating devices 108 and the article supports 102 are co-adjacent and substantially uniformly spaced. During their concomitant movement along this predetermined path which defines the operating area, the article supports and operating devices are brought into juxtaposition so that the desired operation may take place. The speeds of the two conveyors are so governed that there is no linear or curvilinear relative movement between the article supports 102 and the operating devices 108 within this limited operating area.

Each conveyor described herein is of the link-chain type, having pins 501 connected by links 522 and 523. Each pin is provided with upper and lower guide rollers 526 and 527.

In the particular form of the invention illustrated in Fig. 1, the two conveyors are arranged to move the article supports and operating devices in parallel arcuate paths. An essential feature of the system illustrated is that the two conveyors effect continuous movement of the operating devices and the articles without having any relative movement between them. Thus, during the time that the two conveyors move along their uniformly-spaced co-adjacent paths, the operating devices may be performing operations of any desired type upon the articles carried by the article supports. Insofar as the article supports and operating devices are concerned, they might just as well be stationary in space since there is no relative movement between the two.

It will readily be appreciated that in order to obtain this operating area in which there is no relative movement between the operating devices 108 and the article supports 102, the speeds of the two conveyors must be carefully regulated. This is accomplished by independent drive means for each conveyor system, each conveyor being driven by a power-driven sprocket 114, driven by a variable speed motor 250 through a driveshaft 251. The speed of each conveyor is so regulated by means of each variable speed motor that the ratio of the speeds of the two conveyors is directly proportional to the ratio of the radii of the concentric arcs determined by the paths of each conveyor.

In addition to providing for careful regulation of the speed of each conveyor, in order to bring the article supports 102 into juxtaposition with the operating devices 108, it is necessary to space the article supports on their conveyor 101 and the operating devices on their conveyor 107 by certain calculable distances. In order to bring about the desired juxtaposition, the ratio of the distance between the article supports to the distance between the operating devices should be equal to the ratio of the speed of the article support carrying conveyor to the speed of the other conveyor. This is merely a matter of mechanical adjustment.

In the form of the invention illustrated in Fig. 1, the operating area is determined by guiding each of the two conveyors through an arcuate path, in which each path is centered about a common center. Similar results may be obtained where the operating area is determined by conveyor paths of different configurations. Thus, in the modified form of the invention illustrated in Fig. 3, the paths of movement of the first conveyor 101 and the second conveyor 107 are parallel to each other. With this arrangement, the linear speeds of the two conveyors are identical throughout the operating area. Within the operating area, there is thus no relative linear movement between each article support 102 and the corresponding operating device 108.

While only two operating area configurations, the arcuate and the linear or straight path operating area, between conveyors moving in parallel planes, have been illustrated and described, it will be readily understood that many other operative relationships are possible.

A suitable transfer device was used in connection with the present invention and is illustrated in detail in Figs. 4, 5 and 6. The transfer device 108 is mounted on its conveyor 107 through suitable brackets 678 and 679 which are mounted on the conveyor. Each of these supporting brackets 678 and 679 is secured to a pair of adjacent pins 674 on the conveyor. The support brackets 678 and 679 are secured to a third and much larger support bracket 681 which carries the weight of the transfer device and any article which it picks up. The transfer device comprises a pair of jaws 621 and 622 which are pivotally mounted on a pin 682. These jaws are operated by a slide 684 which is connected to the jaws through a pair of links 685 and 686. A pair of springs 687 and 688 are secured to the supporting bracket 681 and to the slide 684, and normally urge the jaws toward the closed position illustrated at Fig. 4. As the transfer device is conveyed through the operating area, the jaws may be actuated as desired by means of a cam mechanism comprising a cam follower wheel 693 which is arranged to engage a cam track 694 extending along and carried by the guide rail 112. The cam follower wheel 693 actuates a bell crank lever 691 which is connected to the slide 684 by a link 692. As the bell crank lever 691 is moved away from the conveyor 107 in an inward and counterclockwise direction through engagement of the cam wheel 693 with the raised portion of the cam track 694, the slide 684 is moved to the left, thereby retracting or opening the jaws 621 and 622 against the biasing action of the springs 687 and 688.

The article support is similarly mounted on its conveyor 101. The support brackets for the article carrier 524 and 525 are mounted on a pair of links 522 and 523 in the conveyor chain 101. Upper and lower guide rollers 526 and 527 are rotatably mounted on the upper and lower ends respectively of the pins 521 in the conveyor chain 101. The guides 103 and 104 for the conveyor comprise a support beam 531 carrying an upper guide channel 532 and a lower guide channel 533, in which the upper and lower guide rollers 526 and 527 move during their movement along the predetermined path portion of the travel of the conveyor in the operating area. The article support 534 is provided with a rotatable surface member 535 which is connected by means of a shaft 536 depending downwardly through the support 234 to a lower sprocket 537. During movement of the conveyor along its predetermined path, the supporting surface 535 of the article support 534 may be rotated at any desired speed by engagement of the sprocket 537 with a control chain 541. The control chain 541 is movable beneath the main conveyor chain and is guided by its own guide tracks 542 and 543, which engage respectively the upper and lower rollers 544 and 545 of this conveyor chain.

Figure 8:
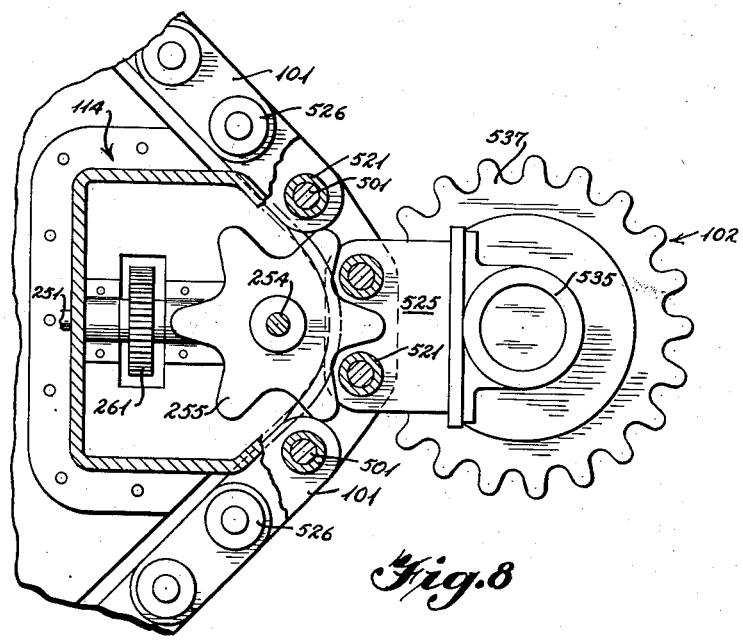
Fig. 8 is a sectional view taken on line 8—8 of Fig. 7.

The drive mechanism for each of the main conveyor chains may be similar. One suitable form of driving mechanism is illustrated in detail in Figs. 7 and 8. These figures represent the drive provided at the sprockets 114 in Fig. 1. Power from an electric motor 250 or other suitable source is supplied through the driveshaft 251 to a pair of bevel gears 252 and 253, and through these bevel gears to a driveshaft 254 which drives the sprocket 255. The teeth on sprocket 255 engage the pins 521 in the conveyor chain, thereby supplying power at a predetermined speed to move the conveyor chain and the article supports carried thereon at a desired rate of speed throughout the entire orbit of travel of the conveyor, and also throughout the predetermined path of travel where the conveyor is particularly guided through the operating area.

In order to regulate the speed of the chain 541 which controls the rotation of the article carried on the rotatable surface 535 on the article support 534, power is supplied to a countershaft 263 through a pair of spur gears 261 and 262. The countershaft 263 operates a pair of bevel gears 264 and 265 which in turn cause the rotation of a driveshaft 266 on which the lower sprocket 267 is mounted. The teeth on the sprocket 267 engage the pins 541 of the work support rotating chain. The sprocket 267 has two rows of teeth 268 and 269, which engage the chain on opposite sides of the teeth of the sprocket 237 which is mounted below the article support 534.

Since the supporting conveyor chain and the work support rotating chain are moved by this mechanism in the same direction, if they were to be moved at the same speed, there would be no rotation of the rotatable article supporting surface 235. However, inasmuch as the spur gearing 261 and 262 allows for the provision of a speed differential, in this case moving the turning chain at a slightly greater speed, the rotatable work supporting surface 235 will be slowly rotated as the work support moves along its predetermined path.

There has been described above specific embodiments of the basic invention for the purpose of illustrating the invention only. It should be understood that the scope of the invention is not intended to be limited thereby. Many other arrangements of conveyor systems are contemplated within the scope of the invention. For example, it will be understood in connection with Fig. 1 that there may be other conveyor systems employed in conjunction with the conveyors therein illustrated and specifically described. In particular, it is contemplated that there may be at least one additional conveyor system for depositing the articles upon the article supports 102 carried by the article carrying conveyor 101. Similarly, there may be an additional receiving conveyor which is designed to receive the articles which have been transferred to the second conveyor 107. Although the embodiments of the invention thus far described contemplate the use of conveyor systems whose paths lie on the same plane or in parallel planes, it is contemplated that the paths of the conveyor systems involved may be at any angle to each other between 0° and 90°.

Many possible applications of the conveyor systems of the present invention will occur to those skilled in the art. For example, the invention described is particularly applicable for use with machines for making glass products, machines for filling toothpaste tubes, machines for filling bottles and other receptacles, machines for use in the production of electric light bulbs, vacuum tubes, television tubes, and for many other similar applications.

I claim:

1. In a machine for performing operations upon continuously moving articles, a conveyor system comprising a first conveyor, a plurality of article supports pivotally mounted on said first conveyor, guide means for said first conveyor determining a path along which said supports are moved during at least a portion of their travel, a second conveyor outside the orbit of travel of said first conveyor, a plurality of operating devices carried by said second conveyor, guide means for said second conveyor determining a path along which said devices are moved during at least a portion of their travel coadjacent with the path of said first conveyor, means for driving said conveyors to move said supports and said devices along said path to concomitantly move said supports and said devices along the coadjacent portions of said paths, a chain parallel to and driven synchronously with the first conveyor, and sprockets coupled to said article supports and engageable by said chain for turning said article supports about their pivots during movement of said first conveyor along said path.

2. In a machine for performing operations upon continuously moving articles, a conveyor system comprising a first conveyor, a plurality of article supports pivotally mounted on said first conveyor, guide means for said first conveyor determining a path along which said supports are moved during at least a portion of their travel, a second conveyor outside the orbit of travel of said first conveyor, a plurality of operating devices carried by said second conveyor, guide means for said second conveyor determining a path along which said devices are moved during at least a portion of their travel coadjacent with the path of said first conveyor, means for driving said conveyors to move said supports and said devices along said paths to concomitantly move said supports and said devices along the coadjacent portions of said paths, a chain parallel to and driven synchronously with the first conveyor, sprockets coupled to the article supports and engageable by said chain for turning the article supports about their pivots during movement along said path, a cam associated with the guide means for said second conveyor, and followers operated by said cam and coupled to the operating devices for closing operation thereof during movement of said devices along the path of said second conveyor.

3. In a machine for performing operations upon articles, a first conveyor, a plurality of article supports pivotally mounted on said first conveyor, a second conveyor outside the orbit of travel of said first conveyor, a plurality of transfer devices carried by said second conveyor, guide means extending along parts of the paths of movement of said conveyors determining coadjacent portions of the paths of said conveyors, a chain driven synchronously with said first conveyor, sprockets coupled to the article supports and engageable by said chain for turning said article supports during movement of said first conveyor along its path, said transfer devices including gripper jaws, followers coupled to said gripper jaws to open and close the jaws, and cam means associated with said guide means for operating said follower to actuate said jaws during movement of said second conveyor along the coadjacent portions of the paths of movement of said conveyors.

(References on following page)

References Cited in the file of this patent

UNITED STATES PATENTS

| | | | |
|---|---|---|---|
| 834,275 | Dorer | Oct. 30, | 1906 |
| 1,654,091 | Peiler | Dec. 27, | 1927 |
| 1,906,604 | Hutchinson | May 2, | 1933 |
| 2,096,264 | Schutz | Oct. 19, | 1937 |
| 2,112,119 | Rowe | Mar. 22, | 1938 |
| 2,443,182 | Carter | June 15, | 1948 |
| 2,611,493 | Nordquist | Sept. 23, | 1952 |